July 4, 1961      T. GREWE      2,991,369

APPARATUS FOR DETERMINING THE POSITION OF PRINTED ITEMS

Filed May 14, 1957      2 Sheets-Sheet 1 a)

b)

c)

d)

e)

f)

g)

INVENTOR

T. GREWE

BY *Robert Harding Jr.*

ATTORNEY

July 4, 1961 T. GREWE 2,991,369
APPARATUS FOR DETERMINING THE POSITION OF PRINTED ITEMS
Filed May 14, 1957 2 Sheets-Sheet 2

INVENTOR
T. GREWE
BY Robert Harding Jr
ATTORNEY

United States Patent Office 2,991,369
Patented July 4, 1961

2,991,369
APPARATUS FOR DETERMINING THE POSITION OF PRINTED ITEMS
Theodor Grewe, Stuttgart-Weil im Dorf, Germany, assignor to International Standard Electric Corporation, New York, N.Y., a corporation of Delaware
Filed May 14, 1957, Ser. No. 659,164
Claims priority, application Germany May 24, 1956
6 Claims. (Cl. 250—219)

The invention relates to a method of and apparatus for determining the position of a printed or written item with respect to a distinguishing mark attached thereto, and in particular for determining the proper readable position of letters or cards, etc. It is often desirable to determine the position of items, such as letters, cheques, bank notes, and the like, which are required to be sorted according to the place of destination, holder, number, or the like. In order to simplify the description hereinafter, there will only be mentioned letters, the position of which is required to be determined with respect to the postage stamp, without, however, the invention being restricted to this example.

The letters to be sorted are generally led past the sorting position on an edgeway conveyor belt. Thus the letters may basically assume any one of four different positions provided there are means which are adapted to always direct the letters with their long edge in the direction of movement. For determining the position of the letter, it is appropriate to first determine the location of the postage stamp since it may be assumed in the normal case that the stamp is stuck to the front side in the right-hand upper corner. The problem is thus to check the probable stamp location, that is, the right-hand upper corner of the letter, and to apply a test which the presence of a postage stamp may be concluded.

According to the invention, the color difference of the probable upper location of the distinguishing mark is compared with the non-distinguished portion of the item, and the color difference of the probable lower location of the distinguishing mark is compared with the same non-distinguished portion of the item, and the resulting greater difference in color is used as the criterion for determining the location of the distinguishing mark. Appropriately, the inventive method is carried out in such a way that when measuring the differences in color, the three portions of comparison of the item are exposed to light one at a time in turn and that the reflected light is received by three color-sensitive receivers, such as photocells and color filters, having each a different color selection (e.g., red, green, blue), whereby three electric signals are produced for characterizing the reflected light according to colors, saturation and brightness. Thereupon, the three electric signals are correspondingly compared with one another.

The comparison of the signals and the determination of the criterion for the location of the distinguishing mark (stamp) can be carried out in such a way that the output signals of the three receivers are at first stored, and that the storage values corresponding to the middle portion or center area act upon the voltages of a three-phase system in the sense of a division, and that the signals associated with the corners act upon the output signals of dividing arrangements in the sense of a multiplication, and that finally the six outputs of the multiplying arrangements are combined in such a way in two three-phase systems (rotary current systems) via six equal resistances, that the two zero-conductor currents can be used as a measure of the differences in color of the corners compared with the middle portion of the item.

If colored postcards happen to be among the items to be examined, it is necessary to turn the cards, manually or automatically, prior to the examination, in such a way that the written text (and not the colored illustration on its reverse) is always led past the sensing device. In this pre-examination, the color-side is determined by measuring the color on the front side and the reverse—possibly after having covered up those parts on which the stamp is likely to be—in order to exclude these disturbing zones. The output signals are evaluated in such a way that criteria for the saturation of the color are produced. If on one side of the item a predetermined saturation value is exceeded, then it may be concluded from this indication that a colored postcard (postcard with a colored illustration on one side) is involved. In such a case, only that side of the item showing the smaller saturation value of color will be examined with respect to the location of the postage stamp. If both sides show only a slight or small saturation value then the location of the stamp is tested on both sides, and the more probable location is measured by a comparison of the results obtained.

The above mentioned and other advantages of the invention will become more apparent by reference to the following description taken in conjunction with FIGS. 1 to 4 of the accompanying drawings, in which:

FIG. 1 schematically shows the exposing arrangement for an item;

In the following, the invention will be described with reference to the process of determining the position of a letter with respect to the postage-stamp.

Figure 1:
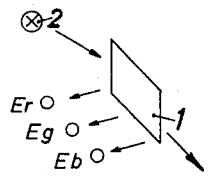
Figure 2:
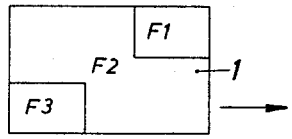
FIG. 2 shows a mail item with the three portions to be examined.
Figure 3:
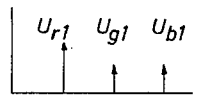
FIG. 3 shows diagrams of the individual signals and voltages appearing in the course of the examination.
Figure 3:
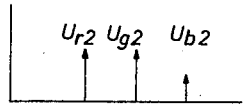
Figure 3:
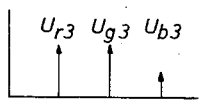
Figure 3:
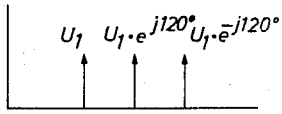
Figure 3:
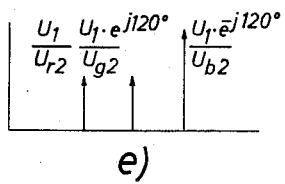
Figure 3:
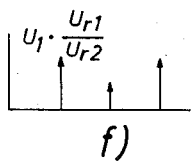
Figure 3:
Figure 4:
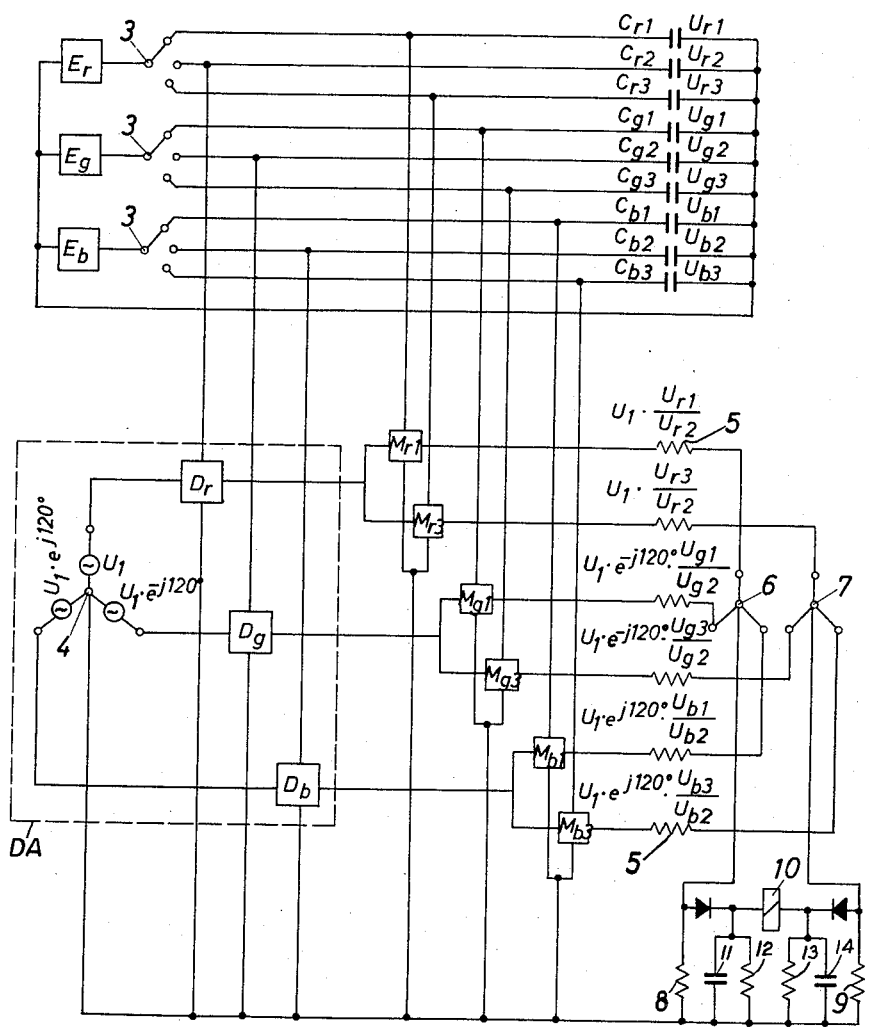
FIG. 4 shows a circuit arrangement for producing reference currents.

The letter 1 is divided in three areas $F_1$, $F_2$ and $F_3$, which areas are successively exposed in the sensing device by the light source 2 since a letter will be assumed to be moving past light source 2 upon an edgeway conveyor belt designated by an arrow in FIGS. 1 and 2, and not otherwise shown. The light reflected by the successively illuminated areas falls upon the three color-sensitive receivers $E_r$ (red), $E_g$ (green), $E_b$ (blue) and which may be photoelectric devices with suitable color filters thereon. These three receivers are adapted to deliver signals which are in proportion to the reflected light intensities. Since the three areas to be examined are illuminated successively, that is, one at a time in turn, there are produced nine D.C.-signals which are stored in the provided nine condensers $C_{r1}$ ... $C_{b3}$ (FIG. 4). The voltages are applied to the proper condensers by means of the switch 3 which switch is synchronized with the speed of movement of the letter 1 along the conveyor path. The voltage signals $U_r$, $U_g$, $U_b$, produced in the receivers, are vectorially shown in FIGS. 3a-c. The numerical indices refer to the corresponding areas $F_1$, $F_2$ and $F_3$, while the letter indices are related with the corresponding colors, in the present example: r=red, g=green, b=blue. The evaluation of the voltages $U_{r1}$ ... $U_{b3}$, which are stored in the condensers is effected with the aid of a dividing arrangement DA consisting of the balanced three-phase voltage source 4 (FIG. 4), delivering the voltages $U_1$, $U_1 \cdot e^{j120°}$ and $U_1 \cdot e^{-120°}$ (FIG. 3d) and gating circuits $D_r$, $D_g$ and $D_b$, respectively. The three voltages derived from source 4 are applied to the gating circuit $D_r$, $D_g$ and $D_b$ which are of the "and" type. Apart therefrom, the voltage $U_{r2}$, which is produced in the receiver $E_r$ at the scanning of the comparison area $F_2$, is applied to the gating circuit $D_r$, and the corresponding voltage $U_{g2}$ of the receiver $E_g$ is fed to the gating circuit $D_g$, while to the gating circuit $D_b$ there is fed the corresponding voltage $U_{b2}$ of the receiver $E_b$. These voltages act in such a manner upon the voltages of the three-phase system that voltages will appear at the outputs of the gating circuits behaving in the opposite manner to the voltage values of the condensers $C_{r2}$, $C_{g2}$ and $C_{b2}$ than is shown in FIG. 3e. The output voltages $$\left(\frac{U_1}{U_{r2}}; \frac{U_1 \cdot e^{j120°}}{U_{g2}}; \frac{U_1 \cdot e^{-j120°}}{U_{b2}}\right)$$

are fed to the six modulator arrangements $M_{r1}$, $M_{g1}$, $M_{b1}$, $M_{r3}$, $M_{g3}$, $M_{b3}$ which, at their outputs, by the action of the corresponding condenser voltages, deliver the voltage values:

(a) $\quad U_1 \cdot \frac{U_{r1}}{U_{r2}}; \; U_1 \cdot e^{-j120} \cdot \frac{U_{g1}}{U_{g2}}; \; U_1 \cdot e^{j120} \cdot \frac{U_{b1}}{U_{b2}}$ at the outputs of the modulator arrangements $M_{r1}$, $M_{g1}$ and $M_{b1}$ (FIG. 3f), and (b) $\quad U_1 \cdot \frac{U_{r3}}{U_{r2}}; \; U_1 \cdot e^{-j120} \cdot \frac{U_{g3}}{U_{g2}}; \; U_1 \cdot e^{j120} \cdot \frac{U_{b3}}{U_{b2}}$ at the outputs of the modulator arrangements $M_{r3}$, $M_{g3}$ and $M_{b3}$ (FIG. 3g).

The voltages of the series (a) are thus a measure for the difference in color of the field or area $F_1$ compared with the area $F_2$, and the voltages of the series (b) represent a measure for determining the difference in color between the areas $F_3$ and $F_2$. The voltages of each series are now added vectorially and the amounts of the sum vectors are compared with one another. Since the amounts are the measure for the differences in color, the greater amount will indicate the greater difference in color.

The vectorial summation or addition can be accomplished in that the voltages of each series are combined in a three-phase system. The zero-currents of the two three-phase systems will then act as the measures for the vectorial voltage sums. The formation of the three-phase systems may be seen from FIG. 4 of the drawings. With the aid of the six equal resistances 5 there are formed the two three-phase systems 6 and 7. The zero currents flow via the resistances 8 and 9 where they cause corresponding voltage drops, the amounts of which are compared with each other. This is effected with the aid of the differential relay 10 after both of the voltages have been rectified. The relay 10 is a direct current relay and, therefore, the rectifiers $R_1$ and $R_2$ are provided in series with the winding thereof. A pair of damping circuits consisting of the parallel condenser-resistance combinations 11, 12 and 13, 14 are disposed between the junction points of the winding of relay 10 and rectifiers $R_1$, $R_2$, and the common lead $C_2$, respectively. The resistance of the path through rectifier $R_1$, the winding of relay 10 and resistance 13 is lower than that of resistance 8.

With the method described, the examinations are carried on successively until the letter has assumed the proper position. However, it is of a still greater advantage to carry out the examinations in such a way that the scanning or sensing operations are performed simultaneously, but separately, on both sides of the mail items. The result of each sensing operation is a probability statement with respect to the presence of the postage-stamp. The statements are compared with one another in a suitable known arrangement which, however, forms no part of the present invention. The result indicating the greatest difference in color is then used for the straightening or the alignment, or also for the sorting of the letter.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. Apparatus for automatically determining the physical position of a distinguishing colored mark on a printed or written item comprising light means, means for successively illuminating discrete areas of said item by said light means, a plurality of light detecting means, each responsive to a different color, each adapted to scan each of the areas of said item, a plurality of series of storage elements, there being one series for each of said detecting means, the number of elements in each series being equal to the number of discrete areas of said item, switch means for successively coupling corresponding storage elements of each series with its associated detecting means, means for successively comparing the contents of given storage elements of each series with a particular element thereof, respectively, and utilization means coupled to said comparing means, said utilization means adapted to respond to predetermined content differences between said given and said particular storage elements.

2. Apparatus for automatically determining the physical position of a colored mark as claimed in claim 1, wherein said storage elements are capacitors and said comparing means comprises a multiphase voltage generating source, the number of phases of said source corresponding to the number of said areas.

3. Apparatus as claimed in claim 2, wherein said comparing means further comprises a plurality of gate circuits corresponding in number to the number of phases of said generating source, each of said circuits having a corresponding input coupled to a different phase of said generating source and having another corresponding input coupled to the particular storage element of each series.

4. Apparatus as claimed in claim 3 wherein said comparing means further comprises a plurality of pairs of modulators, there being one pair per gate circuit, the modulators of each pair having an input coupled in common to the output of its associated gate circuit and having individual inputs coupled to the given storage elements of a series.

5. Apparatus as claimed in claim 4, wherein said comparing means further comprises a plurality of like balancing resistances interposed between the outputs of said modulator and said utilization device, respectively.

6. Apparatus as claimed in claim 5, wherein said utilization device is a differential relay.

References Cited in the file of this patent

UNITED STATES PATENTS

| | | |
|---|---|---|
| 1,729,521 | Roddy | Sept. 24, 1929 |
| 2,244,826 | Cox | June 10, 1941 |
| 2,773,596 | Bartlett | Dec. 11, 1956 |
| 2,774,276 | Glasser et al. | Dec. 18, 1956 |
| 2,795,705 | Rabinow | June 11, 1957 |
| 2,811,707 | Henning et al. | Oct. 29, 1957 |
| 2,833,937 | Cox | May 6, 1958 |

FOREIGN PATENTS

| | | |
|---|---|---|
| 675,556 | Great Britain | July 16, 1952 |